(12) United States Patent
Piec et al.

(10) Patent No.: US 6,873,078 B1
(45) Date of Patent: Mar. 29, 2005

(54) HOMOPOLAR MACHINE WITH IMPROVED BRUSH LIFETIME

(75) Inventors: Zbigniew S. Piec, San Diego, CA (US); Alan Robert Langhorn, San Diego, CA (US); David A. Hazlebeck, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 10/684,090

(22) Filed: Oct. 10, 2003

(51) Int. Cl.[7] ............................................. H02K 31/00
(52) U.S. Cl. ...................................... 310/178; 310/219
(58) Field of Search ................................ 310/178, 219, 310/175

(56) References Cited

U.S. PATENT DOCUMENTS

| | | | |
|---|---|---|---|
| 3,586,894 A | * 6/1971 | Mueller | 310/168 |
| 3,648,088 A | * 3/1972 | Wilkin et al. | 310/178 |
| 3,657,580 A | * 4/1972 | Doyle | 310/52 |
| 3,944,865 A | 3/1976 | Jewitt | 310/178 |
| 4,246,507 A | 1/1981 | Weldon et al. | 310/242 |
| 4,358,699 A | 11/1982 | Wilsdorf | 310/251 |
| 4,415,635 A | 11/1983 | Wilsdorf et al. | 428/611 |
| 4,686,405 A | 8/1987 | McKee | 310/178 |
| 4,698,540 A | 10/1987 | McKee | 310/239 |
| 4,710,665 A | 12/1987 | Kilgore et al. | 310/219 |
| 5,049,771 A | * 9/1991 | Challita et al. | 310/219 |
| 5,451,825 A | 9/1995 | Strohm | 310/178 |
| 5,530,309 A | 6/1996 | Weldon | 310/178 |
| 5,587,618 A | 12/1996 | Hathaway | 310/178 |
| 5,844,345 A | 12/1998 | Hsu | 310/178 |
| 6,489,700 B1 | * 12/2002 | Heiberger et al. | 310/178 |
| 6,586,858 B1 | 7/2003 | Finkle | 310/233 |

* cited by examiner

*Primary Examiner*—Dang Le
(74) *Attorney, Agent, or Firm*—Fitch, Even, Tabin & Flannery

(57) ABSTRACT

A homopolar machine which exhibits reduced wear and prolonged brush life. Current collectors or brushes are mounted so as to maintain substantially constant contact pressure and so that all of them are polarized negative. Brush holders are provided which facilitate the application of precise and constant contact pressure in a region of very high magnetic forces.

3 Claims, 8 Drawing Sheets

HOMOPOLAR MACHINE WITH IMPROVED BRUSH LIFETIME

This invention was made with Government support under Contract Number N00014-00-C-0531 awarded by the Department of the Navy. The Government has certain rights in the invention.

BACKGROUND OF THE INVENTION

The present invention relates to direct current machines, and more specifically to homopolar machines.

Homopolar machines are operated by direct current (DC) and are simple in design principle. They have been under consideration and development for some years for use in ship propulsion applications because of their high efficiency, compact size, low weight, and reduced acoustic signature relative to all other motors, see U.S. Pat. No. 3,657,580 (1972).

As is well known in the art, a homopolar machine includes four major components: armature; stator; field coils; and flux return. The armature is connected to the machine's shaft and may also be referred to as the rotor. The armature typically includes a series of concentric, copper cylinders and is free to rotate in a direction at right angles to the magnetic field lines produced by the field coils. When a voltage is applied across the armature in the direction of the shaft, electric current flows parallel to the shaft. The current and magnetic field interaction (I×B) results in torque generation and rotation, thus producing a motor. In contrast, if the armature is driven externally for a generator application, the interaction of the armature rotating at right angles to the magnetic field lines generates a voltage and electric current.

In both the motor and generator scenarios, current flows along the armature and to the stationary stator via sliding electrical contacts referred to herein as current collectors or brushes, which may take various forms and be made of various materials. Such materials include but are not limited to flexible fibrous copper and flexible copper strips; common to most DC motors, rigid material made from graphite or silver-graphite may also be used.

The field coils are typically circumferentially continuous in geometry and aligned on the same central axis with respect to each other. A homopolar machine always cuts (or crosses as it rotates) magnetic flux lines of a magnetic field in the same direction due to the interacting armature and shaft iron being aligned on the same axis. This means that any point on the rotor always sees the same magnetic field as it rotates, and no differences in magnetic flux or multiple magnetic poles are encountered by conductive elements of the armature as it rotates. Hence the nomenclature "homopolar machine".

The flux return is typically comprised of a highly magnetically permeable material such as iron or steel. The flux return is designed primarily to limit the undesirable stray magnetic field that radiates from the machine; therefore, it typically takes the form of a structural housing that surrounds the motor. In addition, the flux return may also be designed to help direct the magnetic field lines produced by the field coils into the armature interaction region to improve the machine's flux utilization.

Although conventional rotating machines are in wide use, brush wear has been a point of continuing concern. One disadvantage of homopolar machines is that they often tend to have lower reliability in comparison to standard DC motors. Specifically, homopolar machines use current collectors, i.e. brushes, to transfer current between each rotating armature turn and each stationary stator turn. The utility of homopolar machines is the heavily dependent upon current collectors that are potentially unreliable, a large source of efficiency loss, and maintenance problems. Presently, all current collectors need to maintain uniform contact pressure with the armature, and performance is measured in terms of current collector wear and current-carrying capability. Maintaining an ideal contact pressure is difficult because in a homopolar machine the current collectors are generally located in the magnetic field zone where the collectors are subject to bending and torque. Although some homopolar machines have been designed with mechanisms that help to maintain an ideal contact pressure, the size, weight, and cost penalties, that result are troublesome, along with the introduction of new sources of reliability problems. Thus, there is a need to reduce the wear and tear of brushes.

SUMMARY OF THE INVENTION

The present invention advantageously addresses the above needs by providing a homopolar machine that has extended operating lifetime without repair and thus improved overall reliability. This homopolar machine improvement results from a construction such that all of the brushes are polarized negative.

Another aspect of the present invention provides a method of operating a homopolar motor by supplying current to the armature through the use of brushes that are all polarized negative. The method includes the steps of energizing a first field coil in the homopolar machine to a first excitation level; and energizing a second field coil in the homopolar machine to a second excitation level that is different than the first excitation level to produce a magnetic field asymmetry within the homopolar machine that produces an axial force on a shaft of the homopolar machine.

In one particular aspect, the invention provides a homopolar machine comprising a shaft, an armature coupled to the shaft and mounted so as to rotate with said shaft, at least two stators that encircle the armature, a negative bus connected to a first stator, a positive bus connected to a second stator, a first negative brush carried by said first stator for contact with said armature at one location, and a second negative brush carried by said armature for contact with said second stator.

In another aspect, the invention provides a homopolar machine that includes a shaft, an armature assembly, an outer flux return, and a plurality of stator arrays. The armature assembly is coupled to the shaft to rotate therewith and includes a plurality of armature conductor turns. The outer flux return encloses the armature assembly, and the plurality of stator arrays encircle the armature assembly. The stator arrays variously support a plurality of negatively polarized brushes that maintain substantially constant contact pressure with certain location upon the armature conductor turns whereas negatively polarized brushes supported at other armature locations provide sliding electrical current interface with other stator arrays.

In a further aspect, the invention provides improved brush holders designed to support brushes and maintain substantially constant electrical contact pressure throughout the lifetime of the brushes as continuous wear results in foreshortening thereof.

BRIEF DESCRIPTION OF THE DRAWINGS

These and other aspects of the present invention and its advantages will be apparent from the particular description which follows in conjunction with the following drawings.

DETAILED DESCRIPTION OF A PREFERRED EMBODIMENTS

In accordance with the principles of the present invention, a homopolar machine is described that addresses the problems discussed above with respect to current collector performance and wear.

To improve current collector performance, a homopolar machine embodying features of the present invention uses current collectors or brushes that maintain substantially constant contact pressure and are polarized negative. As will be discussed, the brushes are flexible and may be made from either electrically conductive fibers or stacked strips such that they will bear against the opposing surface while subject to relative rotation therewith.

Figure 1:
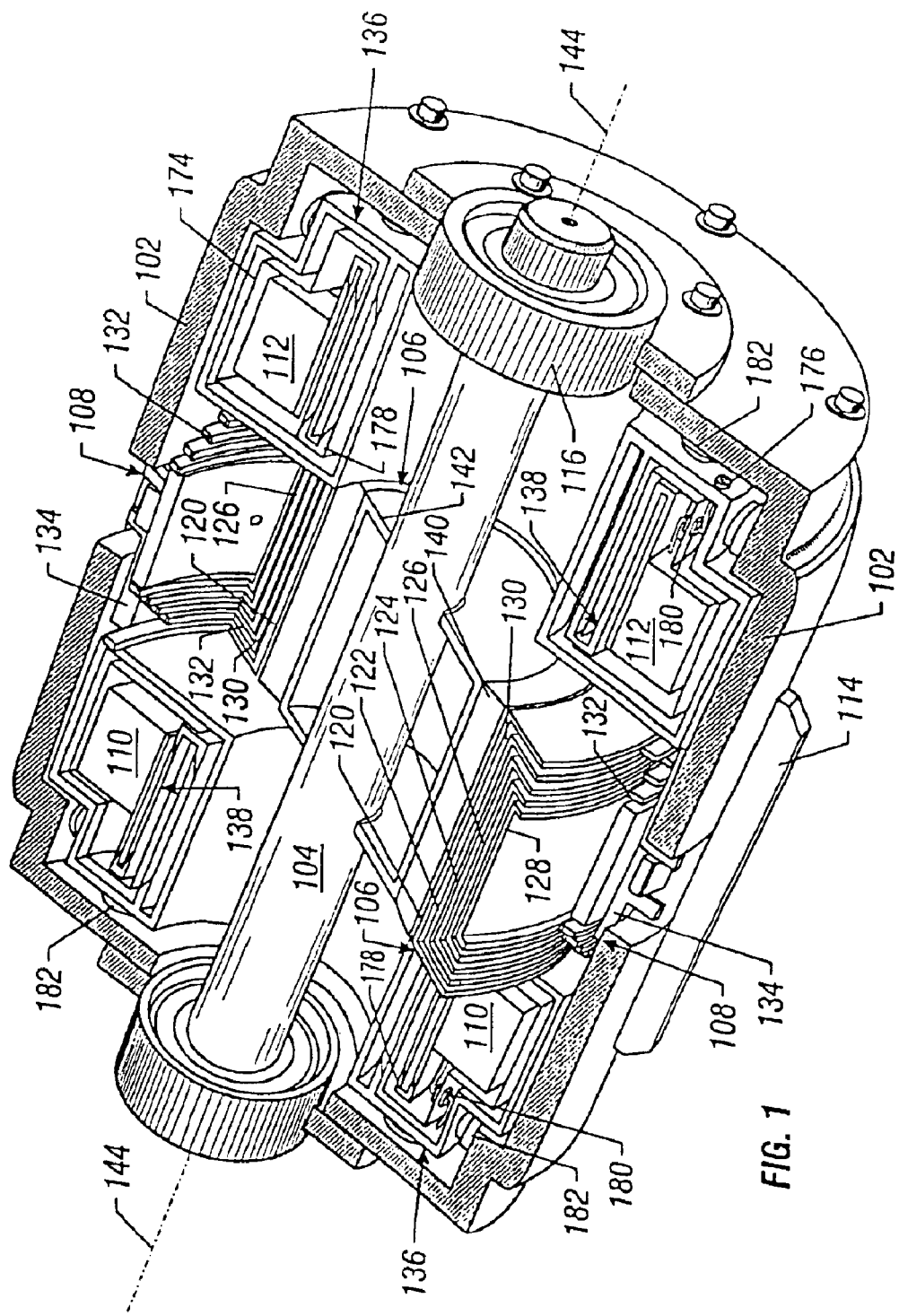
FIG. 1 is a perspective view illustrating the main components of a prior art homopolar machine in which the present invention may be advantageously incorporated.
Figure 2:
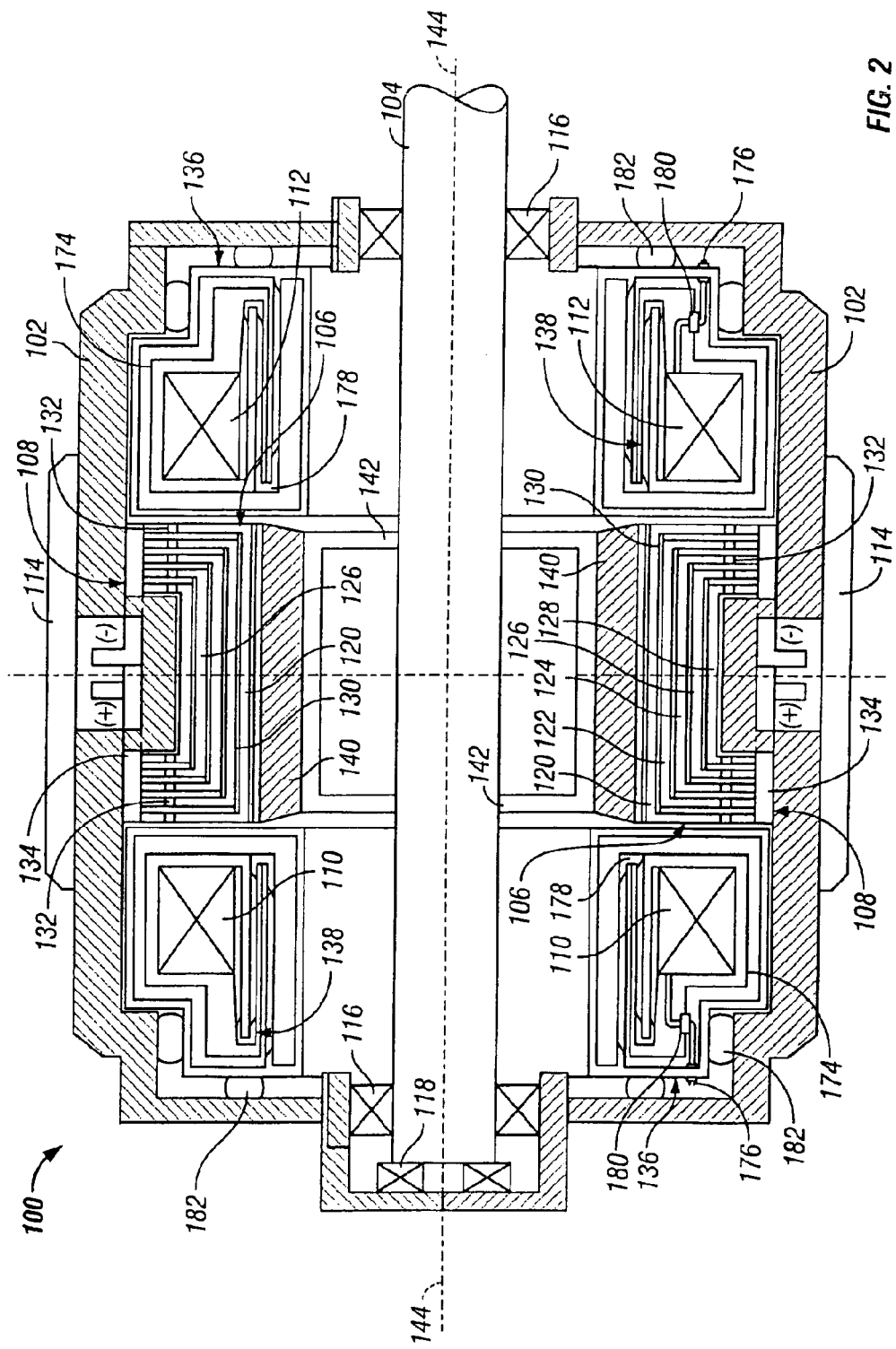
FIG. 2 is a top planar cross-sectional view of the homopolar machine of FIG. 1.

For the purpose of exemplifying a homopolar machine in which the present invention may be advantageously employed, FIGS. 1 and 2 illustrate a prior art homopolar machine 100 that may be operated as either a direct current (DC) motor or a generator. Details of construction and operation of this homopolar machine are set forth in U.S. Pat. No. 6,489,700 (Dec. 3, 2002), the disclosure of which is incorporated herein by reference. In general, the homopolar machine 100 includes an outer flux return 102, a shaft 104, an armature assembly 106, several stator-current collector arrays 108, and two field coils 110, 112. The preferred geometry of the homopolar machine 100 is such that the pair of field coils 110, 112 are circumferentially shaped and are mounted in line (along a common z-axis) with the armature assembly 106 located between them. The outer flux return 102 substantially surrounds all the components. By way of example, the homopolar machine 100 may have a radius of approximately 0.5 meter.

The outer flux return 102 is preferably substantially cylindrical in shape and is constructed from a material with high magnetic permeability, such as iron or steel. The outer flux return 102 encloses the machine's internal components and substantially reduces the amount of magnetic flux radiating from the machine. The outer flux return 102 may serve as a substantial structure that reacts the machine's torsional and magnetic loads and may be augmented with additional structural reinforcement 114.

The shaft 104 is supported by radial bearings 116 and a thrust bearing 118, shown in FIG. 2, is internal to the homopolar machine. The thrust bearing 119 maintains the axial position of the shaft 104.

The armature assembly 106 and the stator-current collector arrays 108 are preferably comprised of electrically conductive elements made from copper, copper alloy, or other materials with similar electrical properties. The illustrated armature assembly 106 includes a plurality of stacked concentric cylinders having a squared-U, radial axial cross-sectional shape 120, 122, 124, 126, 128 separated by electrical insulation 130. Such an the armature assembly 106 may include any number of conducting turns. Each armature conductor cylinder 120, 122, 124, 126, 128 is distributed symmetrically around the circumference to provide, a substantially uniform electric current distribution around the circumference.

The armature conducting cylinders or turns 120, 122, 124, 126, 128 conduct current to several current collectors 132 and stator conductor turns 134 that are electrically connected in series between the armature conducting turns 120, 122, 124, 126, 128 to form one of the stator-current collector arrays 108. A plurality of such stator-current collector arrays 108 are preferably distributed circumferentially and symmetrically around the armature assembly 106 to form the stator. The electric current carrying elements may be water-cooled via internal cooling channels, cooled by direct spray of a liquid coolant compatible for use with exposed electrical conductors, forced air or internal circulated gas, or any combination of such methods.

The field coils 110, 112, which provide the background magnetic field, may be resistive electromagnet coils or superconducting coils. It is preferred that field coils 110, 112 are used as a circumferentially continuous in geometry and are superconducting coils that are formed from circumferentially wrapped electrically superconducting wire. Superconducting coils produce higher magnetic fields, which results in a smaller and lighter motor. For each of the field coils 110, 112 manufactured from superconducting wire, a field coil cryostat 136 is provided that is essentially a vacuum vessel. The vacuum vessel has disposed within it the field coils 110, 112, which are structurally supported by cryostat cold-to-warm support structures 138 as well known in this art.

An inner flux return 140 is positioned around the inner perimeter of the armature assembly 106 which is cylindrical in shape and constructed from a material with high magnetic permeability. The inner flux return 140 is mechanically coupled to the machine shaft 104 via a shaft structure 142 and is encircled by the armature assembly 106, i.e., circumferentially surrounded by the armature assembly 106. The armature assembly 106 and the inner flux return 140 both comprise a rotor assembly, which is rotationally disposed within the stator (i.e., the plurality of stator-current collector arrays 108).

The field coils 110, 112, outer flux return 102, armature assembly 106, stator current collector arrays 108, and inner flux return 140 are configured in a cylindrical geometry and assembled so they all share a common central geometric axis 144 that the rotational axis of the shaft 104 and the central magnetic axis of the field coils 110, 112. During operation, the field coils 110, 112 are energized so that their polarities are opposite, causing their magnetic flux lines to repel and deflect into the inner flux return 140 and outer flux return 102, and across the armature assembly 106 and stator-current collector arrays 108. Because the magnetic fields are uniformly distributed in the circumferential direction, no difference in magnetic flux or multiple magnetic poles are encountered by conductive elements of the armature assembly 106 as it rotates; it thus functions as a homopolar machine.

When the homopolar machine 100 is operated as a motor, current is supplied to the rotating armature assembly 106 from the stationary stator via the current collectors 132 located between the armature and the stator. The motor torque is developed as electric current flows at right angles to the flux generated by the stationary field coils 110, 112. These coils are typically superconducting and are cooled within a cryostat 136 having a support structure 138 that is mounted with a plurality of mounts 182. A thermal shield 174 has mechanical connections 178 and 180 to the support structure and to field coil current leads 176. When the homopolar machine 100 is operated as a generator, the mechanically-driven rotating armature assembly 106 generates current as its conductive elements are moved at right angles to the flux, and the current is transported to the stationary stator via the current collectors 132.

Figure 3:
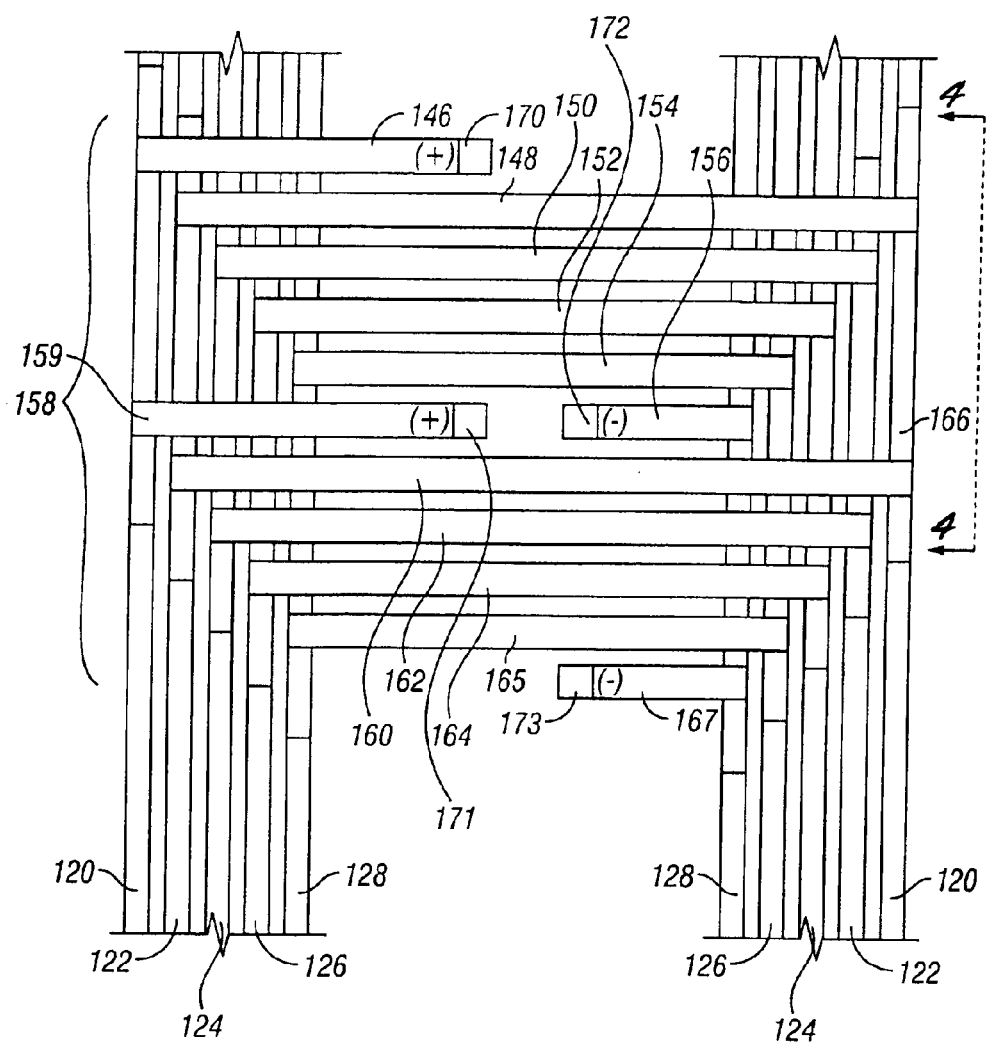
FIG. 3 is a partial side view taken along line 6—6 in FIG. 2 illustrating one complete stator-current collector assembly and part of an armature assembly that may be employed in the homopolar machine of FIG. 1.

FIG. 3, is a fragmentary top view, looking down at the upper surface of the rotor, of one complete stator-current collector array 158 and part of the armature assembly 106 showing portions of the five armature conductor cylinders 120, 122, 124, 126, 128. The stator-current collector array 158 includes stator conductor turns 146, 148, 150, 152, 154, 156, 159, 160, 162, 164, 165, 167. Several such stator-current collector arrays 108 are arranged circumferentially around the homopolar machine 100 to distribute the current.

Figure 4:
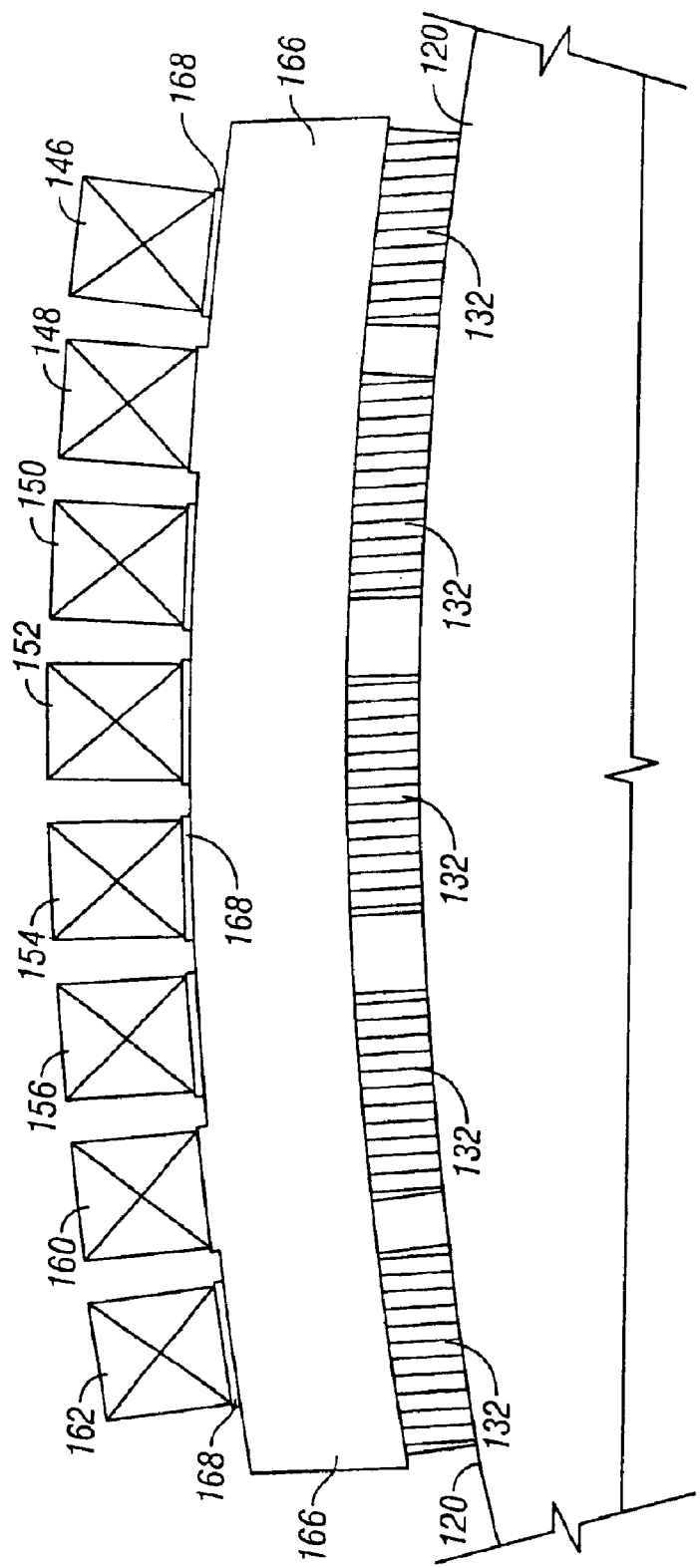
FIG. 4 is an end view as seen from line 4—4 in FIG. 3 of part of the stator-current collector assembly and armature.

FIG. 4 is a fragmentary end view of a portion of the stator-current collector array 158 and the armature conductor cylinder or turn 120 taken along line 4—4 fo FIG. 3. The stator conductor turns 148, 160 are electrically connected to their corresponding circumferential busbar 166, while the other illustrated stator conductor turns 146, 150, 152, 154, 156, 162 are electrically insulated from the busbar 166 with electrical stator turn-to-turn insulation 168. The stator conductor turns 146, 150, 152, 154, 156, 162 are electrically insulated from the busbar 166 because they correspond to busbars (not shown) associated with other armature conductor turns. The stator conductor turns 148 and 160 are electrically in parallel and connect to the busbar 166 which includes five current collectors 132 that conduct current to or from the armature conductor turn 120.

DC electric current is routed through the stator terminals 170, 171, 172, 173 such that current flows between the positive (+) terminals 170, 171 and negative (−) terminals 172, 173. Specifically, current that enters the positive (+) terminals 170, 171 flows through the stator conductor turns 146, 159, then through a circumferential busbar (not shown), then through a current collector (not shown), then through the armature conductor turn 120, then through the current collectors 132, then through the circumferential bus bar 166, then through the stator conductor turns 148, 160, and continues in a similar manner through the remaining armature conductor turns 122, 124, 126, 128, and out the negative (−) terminals 172, 173.

In this prior art machine, the current collectors 132 are made of flexible electrically conductive material, such as electrically conductive fibers or foils made from copper or copper alloys or stacked strips. The flexible current collectors 132 are supported by the stators or by structure supported from the stators and bear against the outer edge of the armature turn's smooth surface. The current collectors or brusher are attached to the stators by means of brush mounts or brush holders as known in this art which may include actuators that may be spring- or fluid-loaded to allow them to be extended or retracted, e.g. see U.S. Pat. Nos. 4,686,405 and 4,698,540.

Figure 5:
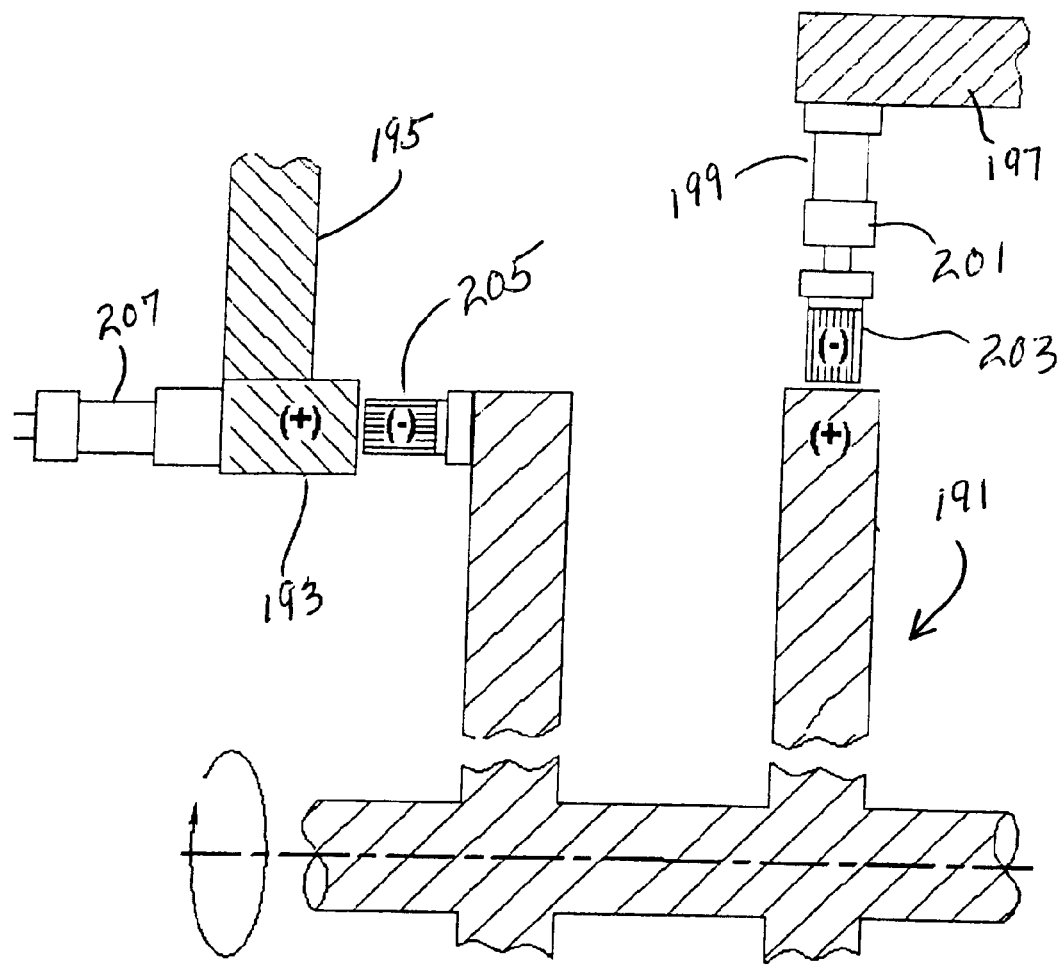
FIG. 5 is a schematic view illustrating one manner in which an armature and stator assembly may be configured in accordance with the present invention.
Figure 6:
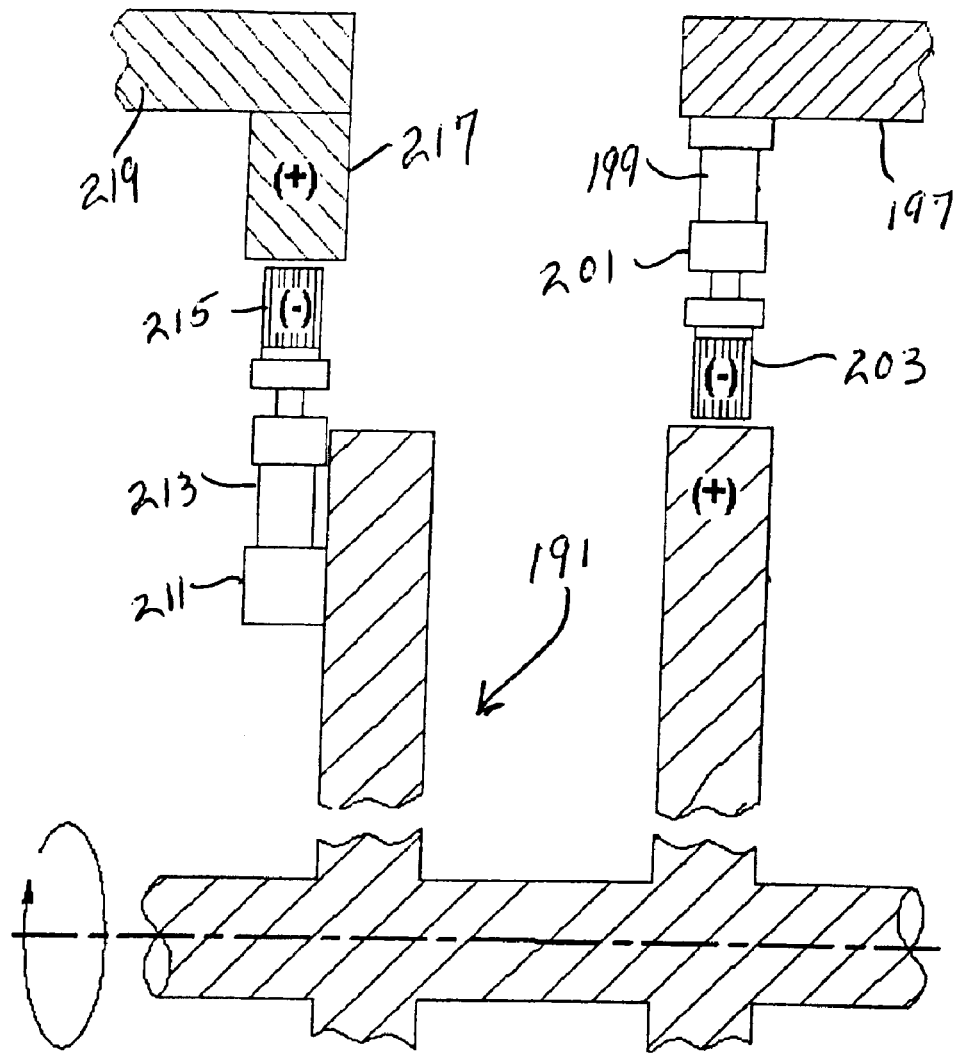
FIG. 6 is a view similar to FIG. 5 illustrating an alternative embodiment.

Shown schematically in FIGS. 5 and 6 are two alternative embodiments of improvements in a homopolar machine with respect to the transfer of the current between an armature and a stator.

Figure 7:
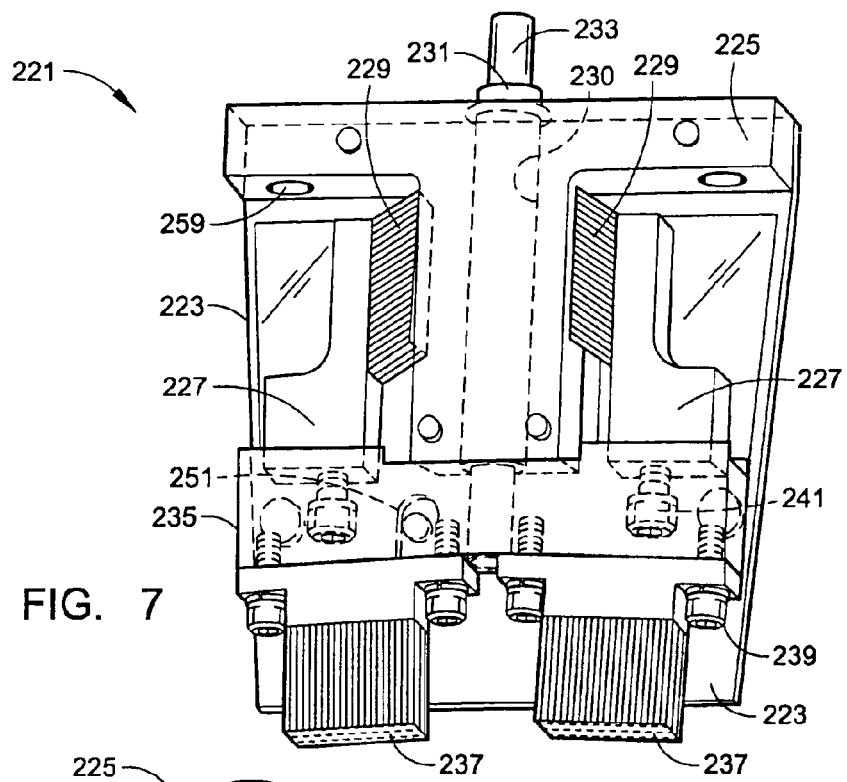
FIG. 7 is a perspective view shown partially in cross section illustrating a holder that might be used effect brush contact and showing the brushes in a retracted condition.
Figure 8:
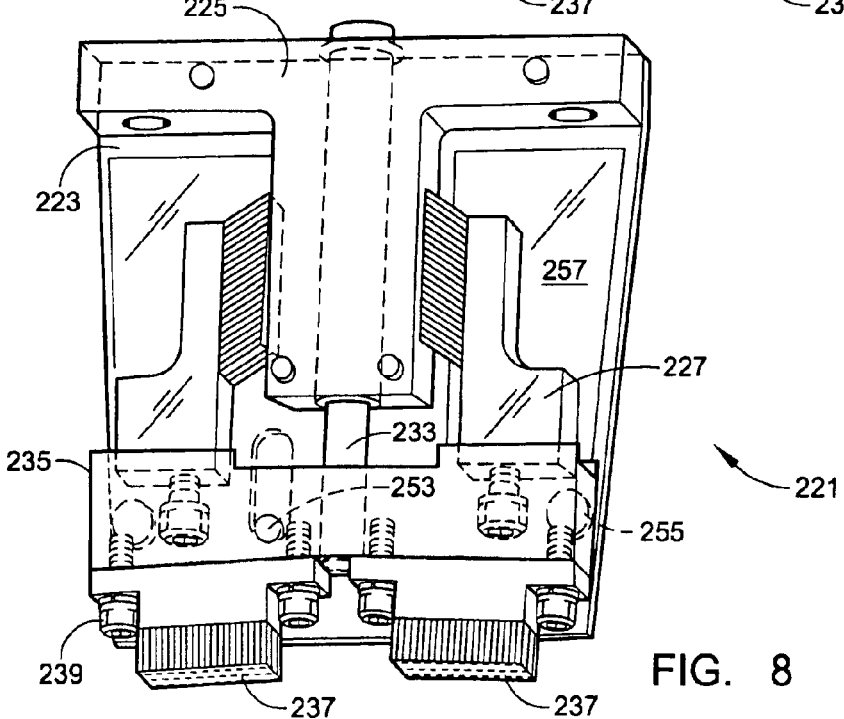
FIG. 8 is a view similar to FIG. 7 showing the brushes in a fully extended condition.
Figure 9:
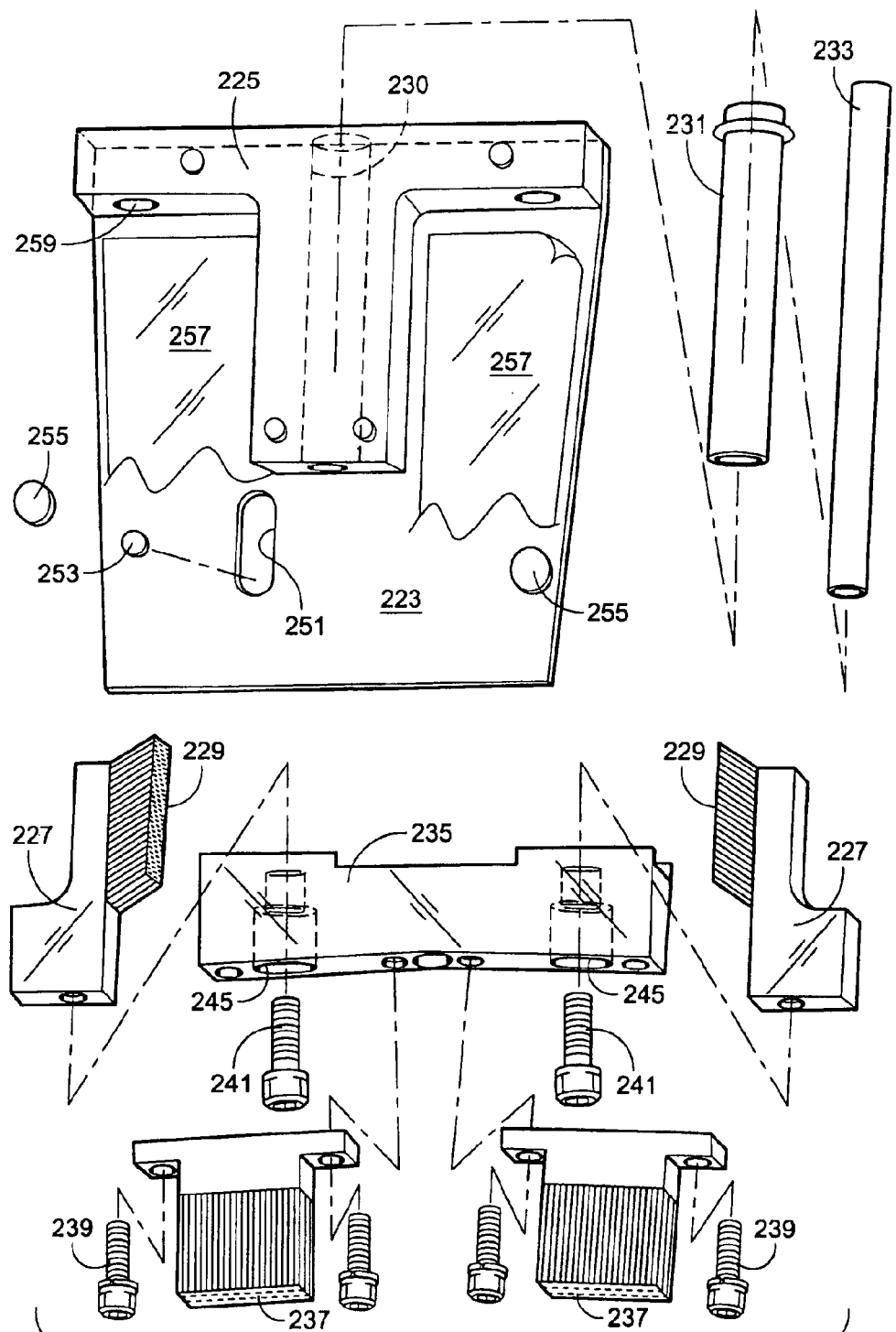
FIG. 9 is an exploded perspective view showing the various pieces employed in the construction of the holder shown in FIGS. 7 and 8.

Illustrated in FIG. 5 is a rotor or armature 191 and a positive stator ring 193 that is connected to a positive flexible bus 195. A negative stator bus 197 carries actuators 199 which, in combination with brush holders 201, urge brushes 203 into contact with one circular edge region of the rotor 191. Representative brush holders are shown in FIGS. 7–9 and are described hereinafter.

Similar current-collecting brushes 205 are carried at a different location on the rotor and extend axially thereof. A pneumatic actuator 207, generally similar to the actuator 199 without any brush holder, presses the positive stator ring 193 against the brushes 205 which are negative and attached to the rotor. Similarly, the actuator 199 presses the brushes 203, which are also negative, against the radical edge of the rotor 191. The actuators are operated to assure that the contact pressure remains substantially constant, and the negative brush arrangement directs potential electron emissions from the brush to the stator ring and effectively eliminates ionization at the fiber tips of the brushes. The result is a far longer brush lifetime, which improvement can be obtained in all direct current motors and generators using such flexible, multi-conductor metal brushes. The result is indeed surprising because it was never appreciated that the rather simple avoidance of such electron bombardment would have such a dramatic effect.

Illustrated in FIG. 6 is an alternative arrangement wherein the rotor 191 is again connected to a negative bus bar 197 through brushes 203 that are supported in a brush holder 201 and maintained in precise constant contact through the use of the actuator 199. However, at the opposite location on the rotor, instead of carrying axially aligned brushes, actuators 211 and brush holders 213 similar to the actuators and brush holders 199 and 201 are carried which are radially aligned. The holders 213 support brushes 215 which extend radially outward, in the opposite direction of the brushes 203, and make contact with a fixed positive stator ring 217 that is connected to a positive polarity bus 219. Thus, the actuators 199 and 211 again maintain constant, precise, low interface pressure between the brushes and the rotor 191 during operation under high electromagnetic loads, which feature is facilitated by the novel design of the brush holders described hereinafter. Here, the brushes 215 are mounted on the rotor so as to move radially outward against the fixed positive stator ring, with the actuator 211 again maintaining a constant pressure between the negative brush and the positive fixed stator. Accordingly, as in FIG. 5, the electron flow in FIG. 6 is from the negatively charged brushes to the stator in both instances.

As mentioned, it was surprisingly found that, when the brushes are negatively charged, they experience a wear rate of only about 10% of that of positively charged brushes in a similar environment. While it is uncertain why this surprising result occurs, it is believed that electron bombardment very likely plays a major factor, and by this simple expedient of a design where the brushes are all negatively charged, ionization at the fiber tips is eliminated and provides these surprising results.

Illustrated in FIGS. 7, 8 and 9 is an example of a brush holder that might be used as the holder 201 that is shown schematically in FIG. 5. The illustrated brush holder 221 includes an insulating plate 223 on which there is mounted a central base or core 225 that is generally T-shaped. These holders 221 will normally be used in a horizontal stack, similar to the arrangement of the collectors 132 shown in FIG. 1, so the plate 223 from the next holder 221 will abut the front face of the T-shaped base 225, forming a cavity or pocket between the two flat plates 223. Disposed in the cavity are a pair of opposed sliders 227 that have flexible, EDM cut, brushlike heads 229 that are slightly flexed and slide in electrical contact with the stem of the base 225. The T-shaped base has a longitudinally extending central passage 230 which receives an open-ended stainless steel cylinder 231 that serves as a bushing in which a drive rod or piston 233 reciprocates that is suitably connected with an actuator at its upper end. The lower end of the drive rod is affixed to a crosspiece or foot 235 that slides within the cavity created by the two parallel plates 223. A pair of depending brushes 237 are bolted by suitable bolts 239 to the undersurface of the crosspiece 235. The sliding contacts 227 are interconnected to the crosspiece 235 by socket head bolts 241 or the like which are received and recessed in passageways 245 extending through the crosspiece 235. These bolts are threaded into tapped holes in the bottom surface of the sliders 227. The passageways 245 in the crosspiece 235 are of slotted shape, as seen in FIG. 9, so as to allow some slight adjustment to the right or left in the crosspiece as viewed in FIG. 7 to assure tight electrical contact between the flexible portions 229 and the T-shaped base 225. The insulating plate 223 is formed with an elongated slot 251 (FIG. 9) which receives a short, flat circular disk 253 affixed to the facing surface of the crosspiece 235; it restricts the extent of longitudinal movement of the crosspiece within the casing. Smooth sliding movement of the crosspiece and the electrical contact sliders 227 is facilitated by glides 255 of a material such as glides 255 of a material such as Teflon and thin sheets 257 of Teflon or the like carried on regions of the insulating plate 223 against which the crosspiece 235 and the sliders 227 will be juxtaposed.

In the embodiment shown, each holder 221 would be bolted to the negative bus by bolts that are received in openings 259 in the two arms at the top of the base 225 which may be threaded if desired. The upper end of the drive rod 233 is suitably connected with an actuator, such as a pneumatic cylinder as known in this art, which is carefully regulated so as to provide a precise amount of pressure on the brushes 237 that are contacting the rotor so as to assure good current flow yet absolutely minimize wear on the multi-conductor flexible brushes. The drive rod or shaft 233 is preferably coated on its exterior surface so as to slide smoothly within the steel 231 in which it resides, and the various Teflon glides assure the smooth downward movement of the sliders 227 and the crosspiece 235 within the casing.

At the time of original start up, the brushes 237 would be in the retracted orientation, such as shown in FIG. 7, residing in an upper location within the casing. As wear slowly occurs, the actuator maintains force on the drive shaft 233 which causes the shaft to gradually slide downward in the bushing 231 to maintain the continuous contact of the brushes 237 against the juxtaposed surface of the rotor at the desired pressure. FIG. 8 depicts the situation when the brushes 237 have worn to such an extent that they are in a substantially fully extended position and thus ready to be replaced. However, as previously indicated, the time it would take for the brushes 237 to wear to this extent may be 10 times as long as the time it would take positively charged brushes to wear to the same extent. This surprising increase in longevity appears to be the result of the avoidance of electron bombardment on the brushes which is a result of operating the homopolar machine with both sets of brushes negatively charged, a result that was never previously appreciated in this art.

Moreover, the particular holder design that is shown has been found to have improved properties for use in a region where magnetic forces are extremely high. It was found that the brush holder design, to function most efficiently, needs to be constructed such that there is both excellent stability and extremely low friction in the guide connections between the actuator and the brushes themselves. The particular design shown has proved to be very effective because it accomplishes both these objectives. High magnetic forces can have unusual effects upon operating components often causing them to twist or be otherwise displaced, and in this respect, the present design, through the use of an extremely stable arrangement of juxtaposed flat surfaces of substantial surface area, has been found to effectively counteract any such adverse effects, while still assuring the smooth downward movement to maintain contact with the rotor at the precise force desired. Likewise, the EDM cut, brushlike, parallel ribbons 229, that have some slight flex as a result of their mounting, maintain excellent contact as a result of their inherent stiffness in a transverse direction.

Although the invention has been described with regard to the certain preferred embodiments which constitute the best mode known for carrying out the invention at this time, it should be understood that various changes in modifications as would be obvious to one having the ordinary skill in this art without departing from the scope of the invention that is set forth in the claims appended hereto. The disclosures of all U.S. patents previously referred to are expressly incorporated herein by reference.

Particular features of the invention are emphasized in the claims that follow.

What is claimed is:

1. A homopolar machine comprising:

a shaft;

an armature assembly coupled to the shaft that includes a cylinder having a pair of spaced apart generally radially extending flanges;

first and second stators arrays that encircle the armature assembly;

a negative bus connected to a first stator;

a positive bus connected to a second stator;

a first negative brush assembly carried by said first stator for contact with said armature at one location; said brush assembly including brushes, an actuator and a holder designed to effect said contact with said armature;

which holder includes (a) radially aligned stem deposed between a pair of parallel flat plates that are mounted in fixed relation to said first stator and (b) a slidable component which carriers a plurality of said first negative brushes and which is slidable between said parallel plates;

said stem being formed with a pair of opposed parallel surfaces that are perpendicular to said flat plates, and said slidable component including a pair of flexible heads that engage said opposed stem surfaces; and a second negative brush assembly carried by said armature for contact with said second stator, as a result of their negative charge, the lifetime of said brushes is substantially extended compared to comparable positively charged brushes.

2. The homopolar machine in accordance with claim 1 wherein said flexible heads include a stack of generally parallel ribbons cut by EDM from conductive metal.

3. The homopolar machine in accordance with claim 2 wherein said heads are mounted so that said ribbons are flexed against said opposed surfaces.

* * * * *

UNITED STATES PATENT AND TRADEMARK OFFICE
CERTIFICATE OF CORRECTION

PATENT NO. : 6,873,078 B1
DATED : March 29, 2005
INVENTOR(S) : Zbigniew S. Piec, Alan Robert Langhorn and David A. Hazlebeck It is certified that error appears in the above-identified patent and that said Letters Patent is hereby corrected as shown below:

<u>Column 8,</u>
Line 55, please delete "deposed" and insert -- disposed -- therefor;
Line 58, please delete "carriers" and insert -- carries -- therefor.

Signed and Sealed this

Twelfth Day of July, 2005

JON W. DUDAS
*Director of the United States Patent and Trademark Office*